June 11, 1946. S. F. CORBELL 2,402,022
TIRE TOOL
Filed Nov. 22, 1943 2 Sheets-Sheet 1
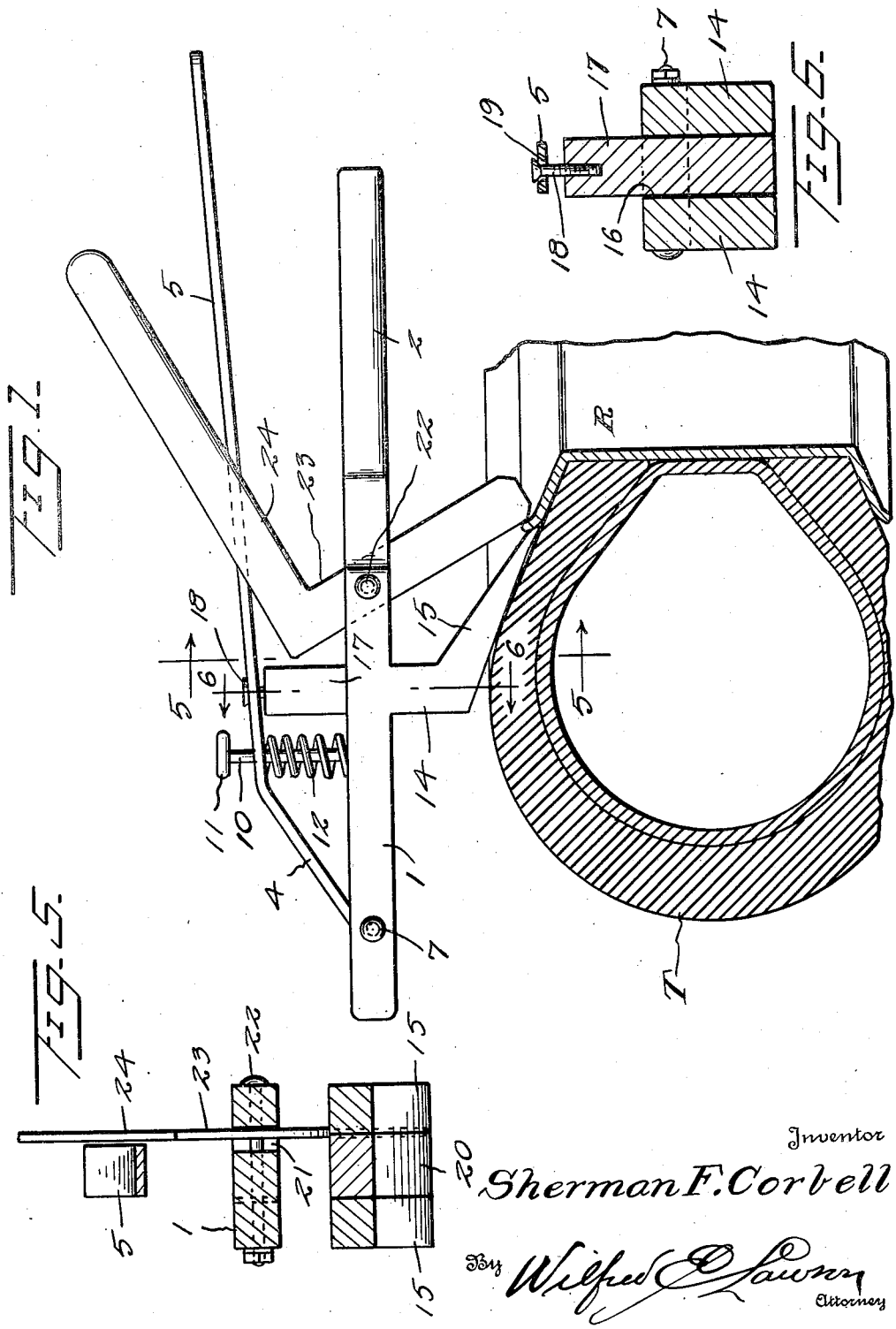
Inventor
Sherman F. Corbell

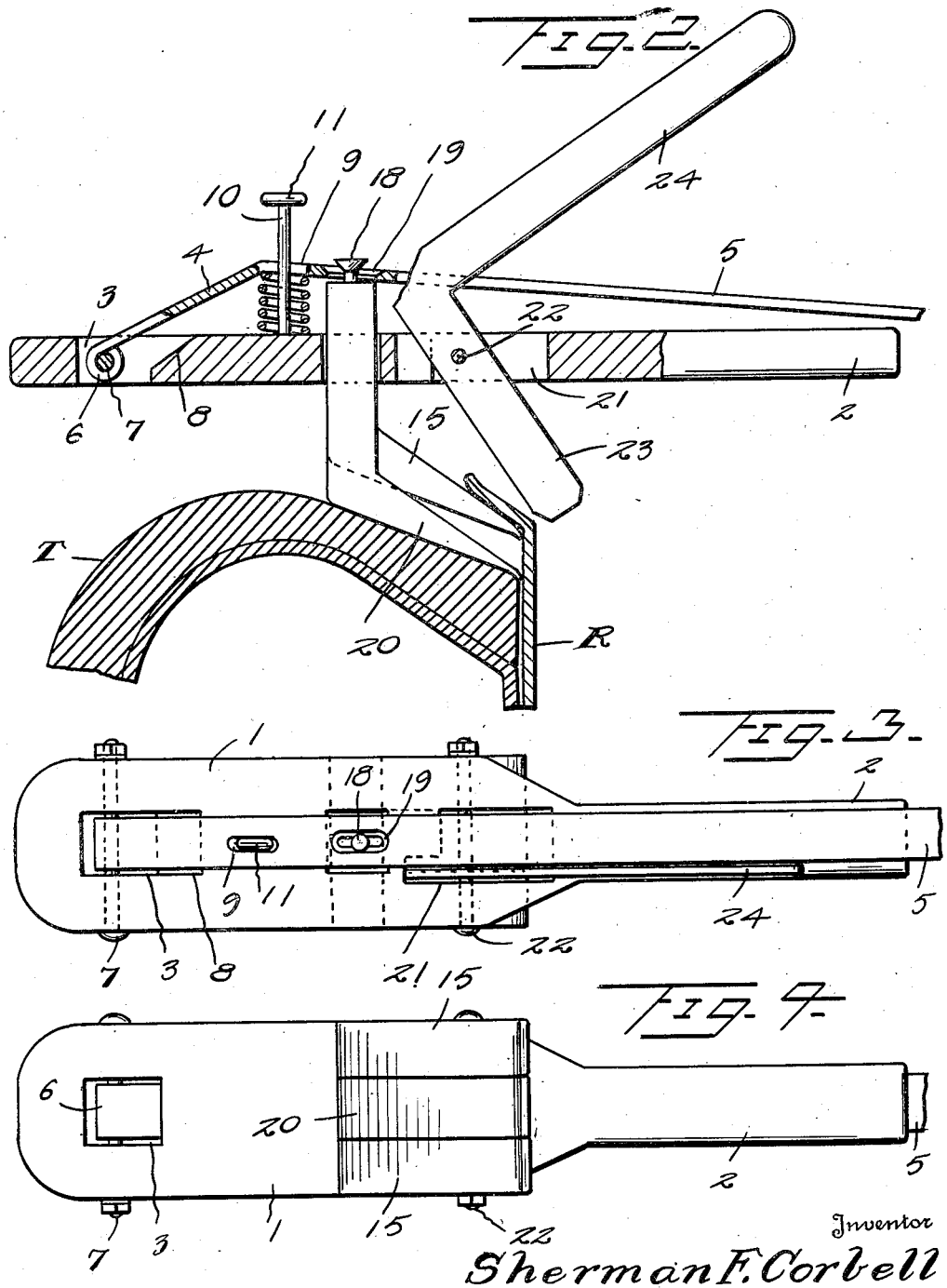

Patented June 11, 1946

2,402,022

UNITED STATES PATENT OFFICE 2,402,022

TIRE TOOL

Sherman F. Corbell, Clifton, Ariz.

Application November 22, 1943, Serial No. 511,321

2 Claims. (Cl. 157—6)

This invention relates to a tire tool, and it is primarily an object of the invention to provide a tool of this kind for separating a stuck tire from the rim.

It is a common custom to pry a pneumatic tire off its rim by using a flat bar and hammering which requires a considerable amount of time and labor and in many instances results in injury to the tire and more particularly in such instances where the tire has become stuck or rusted to the rim. It is a further object of the invention to provide a tool which can be employed in a manner to more conveniently and expeditiously accomplish such removal.

The invention consists in the details of construction and in the combination and arrangement of the several parts of my improved tire tool whereby certain important advantages are attained, as will be hereinafter more fully set forth.

In order that my invention may be better understood, I will now proceed to describe the same with reference to the accompanying drawings, wherein:

Figure 1 is a view in side elevation of a tire tool constructed in accordance with an embodiment of my invention in its initial or starting position, the associated tire and rim being shown in section;

Figure 2 is a view partly in elevation and partly in section illustrating certain of the parts in a second position;

Figure 3 is a top plan view of the tool;

Figure 4 is a bottom plan view;

Figure 5 is a sectional view taken substantially on the line 5—5 of Figure 1; and Figure 6 is a view taken substantially on the line 6—6 of Figure 1.

In the embodiment of the invention as illustrated in the accompanying drawings, the improved tool comprises a relatively long head 1 having one end portion continued to provide a hand grip 2. The head 1 at its outer end portion is provided with an opening 3 in which extends the outer extremity of a relatively short angularly disposed portion 4 of a relatively long lever 5.

This outer extremity of the portion 4 is provided with a transverse sleeve or barrel 6 which receives and freely turns on a pivot pin 7 disposed transversely through the head 1 and passing through such opening 3. The portion of the head 1 immediately adjacent the inner end of the opening 3 is inwardly beveled or chamfered, as at 8, to facilitate the desired swinging movement of the lever 5 with respect to the head 1.

The lever 5 inwardly of, but in relatively close proximity to, the portion 4 is provided with a longitudinally disposed slot 9 through which passes an outstanding post 10 carried by the head 1. This post 10 outwardly of the lever 5 is provided with a cross head 11 whereby the extent of outward movement of the lever 5 is limited. Interposed between the lever 5 and the head 1 is an expansible member 12, herein disclosed as a coiled spring surrounding the post 10.

The inner portion of the head 1 has extending outwardly therefrom at the side thereof remote from the lever 5 the relatively short arms 14 arranged in parallelism and spaced apart transversely of the head 1. The outer extremities of these relatively short arms 14 are provided with the relatively long jaws 15 extending away from the head at an oblique angle.

The head 1 between the short arms 14 is provided with an opening 16 through which freely passes a long arm 17. This arm 17 is of such length as to have one end portion extending beyond the outer ends of the shorter arms 14 and the jaws 15 carried thereby when the long arm 17 is at the limit of its endwise movement as effected by the movement of the lever 5 toward the head 1.

The end of the arm 17 adjacent to the lever 5 is provided with an outstanding headed member 18 which is freely disposed through a slot 19 in the lever 5 and extending lengthwise thereof. This headed member 18 coacts with the lever 5 in a manner whereby backward and forward movement of the arm 17 may be had upon corresponding swinging movement of the lever 5.

The opposite end portion of the arm 17 or that end portion between the short arms 14 is also provided with a relatively long jaw 20 similar to, and extending in the same direction as, the jaws 15 and an expansible member or spring 12 which serves to normally maintain the jaw 20 in a position directly between the jaws 15, so that in the use of the tool all three of the jaws 15 and 20 may be forced between the side of a pneumatic tire T and the rim R.

The inner portion of the head 1 inwardly of the short arms 14 and immediately adjacent to the hand grip 2 is provided with a throat opening 21 traversed by a pin 22 extending transversely through the head 1. This pin 22 is positioned above and forwardly with respect to the outer or free ends of the jaws 15 and 20. Disposed through this opening 21 to one side of the lever 5 and mounted upon the pin 22 is a thrust lever 23. The outer end portion of this thrust lever 23 carries a relatively long thrust arm 24 which extends in the same general direction as the hand grip 2 and overlies the same at one side of the lever 5. The thrust lever 23 extends beyond the opposite side of the head 1 or that side of the head from which the short arms 14 extend a distance sufficient to engage inwardly of the rim R when the thrust arm 24 is in an outward position, so that as this thrust arm 24 is swung toward the hand grip 2, the resultant action of the thrust lever 23 by contact with the rim R will force the jaws 15 and 20 between the rim R and the tire T while said jaws are in their normal side by side position. After this operation, the lever 5 is forced inwardly toward the hand grip 2, resulting in the jaw 20 being moved beyond the jaws 15 with resultant compression of the adjacent portion of the tire T to disengage such portion of the tire from the rim. This is especially advantageous when such portion of the tire is stuck or rusted to the rim.

From the foregoing description it is thought to be obvious that a tire tool constructed in accordance with my invention is particularly well adapted for use by reason of the convenience and facility with which it may be assembled and operated.

What is claimed is:

1. A tire tool comprising a relatively long body forming a head and having a longitudinal extension at one end forming a hand grip, a pair of spaced rigid arms rigid with and projecting from one side of the head intermediate the ends thereof and terminating in two tapered jaws directed obliquely to the length of the head, the head having an opening between the arms, a longer rigid arm slidably positioned in said opening between the first arms and having a blunt end extending beyond the opposite side of the head, said longer arm being movable transversely of the head parallel with the spaced arms, the other end of said longer arm terminating in a tapered jaw angled to parallel the first jaws, a lever pivotally attached at one end to the head adjacent to the end of the head remote from the hand grip and extending longitudinally of the body over said blunt end of the longer arm for co-action with the hand grip, resilient means constantly urging the lever away from the hand grip, and means coupling the lever with the said blunt end of the arm for effecting movement of the second mentioned tapered jaw in one direction upon pressure of the lever toward the hand grip.

2. A tire tool, comprising a relatively long body formed at one end to provide a longitudinally extending hand grip, a pair of arms carried by the body and extending perpendicularly thereto, said arms having integral, relatively long, tapered jaws extending therefrom in a direction toward the hand grip in a line oblique to the length of the body, one of said arms being fixed and the other arm being movable in a line parallel with the fixed arm, a thrust lever pivoted intermediate its ends to the body for oscillation on an axis extending transversely of the body between the arms and the hand grip, said thrust lever being of a length from the oscillation axis to its free end to position said free end in close proximity to the free ends of said jaws, a thrust arm carried upon the other end of said thrust lever and located upon the other side of the body from the jaws adapted for co-action with the hand grip for the actuation of the thrust lever toward the free ends of the jaws, and means for effecting the movement of the movable arm to cause movement of the jaw carried thereby relative to the other jaw in a line perpendicular to the body.

SHERMAN F. CORBELL.